D. R. RALL.
Car Wheel.
No. 8,985.
Patented June 1, 1852.
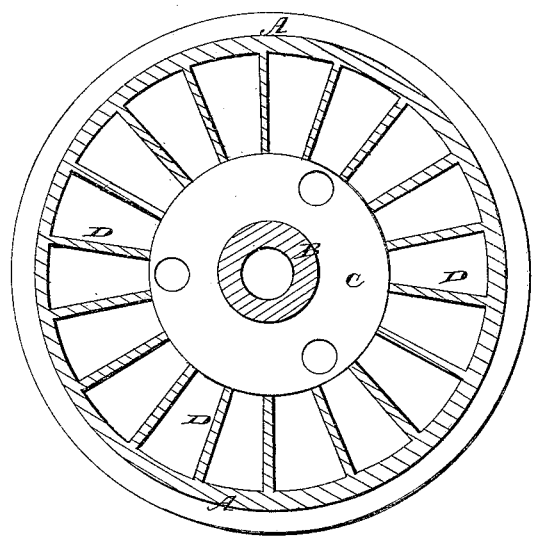
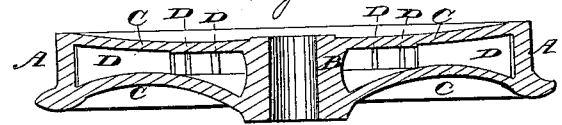

UNITED STATES PATENT OFFICE.

DANL. R. RALL, OF ROCHESTER, NEW YORK.

CAST-IRON CAR-WHEEL.

Specification of Letters Patent No. 8,985, dated June 1, 1852.

*To all whom it may concern:*

Be it known that I, DANIEL R. RALL, of the city of Rochester, in the county of Monroe and State of New York, have invented a new and useful Improvement in Cast-Iron Railroad-Wheels; and I do hereby declare that the following is a full, clear, and exact description of the same, reference being had to the accompanying drawings, forming part of this specification, in which—

Figure 1, is a section of the wheel in a plane perpendicular to the axis, and Fig. 2, is a section of the same in a plane passing through the axis.

Similar letters of reference indicate corresponding parts in each of the figures.

My improved wheel is of that description known as the "shell wheel" or "double plate wheel," the hub and rim or tread being united by two plates with a space between them.

The improvement consists in a series of partitions or braces which connect the two sides or plates of the wheel together and to the rim or tread, the said partitions extending from the rim radially about half way toward the axis of the wheels; these partitions are for the purposes of strengthening the rim and sides, and assisting them in giving support to the hub.

A, A, represents the rim or tread of the wheel, and B, the hub. C, C, are the side plates connecting the tread or rim with the hub. D, D, are the partitions or braces which connect the sides and rim they are in the form of plates set edgewise between the side plates C, C, and do not require to be of great thickness, any number may be employed that may be found desirable. The wheel is intended to be in one solid casting with an undivided hub, and the rim or tread to be cast in a chill.

Having thus fully described my invention I will proceed to state what I claim, and desire to secure by Letters Patent:

I do not claim the concave plates or sides C, C, of the wheel, nor do I intend to limit myself to the precise form of such plates connecting the hub with the rim or tread of the wheel. But

I claim—

The partitions or braces D, D, connecting the rim or tread A, with the two plates or sides C, C, of the wheel, the said partition or braces extending from the inside of the rim or tread, radiating or nearly so, part of the distance toward, but not connecting with the hub, as herein fully set forth.

D. R. RALL.

Witnesses:
S. H. WALES,
GEO. W. NELSON.